No. 718,683. PATENTED JAN. 20, 1903.
G. C. WIEDENMAYER.
CARBONATING DEVICE.
APPLICATION FILED APR. 7, 1902.
NO MODEL. 2 SHEETS—SHEET 1.
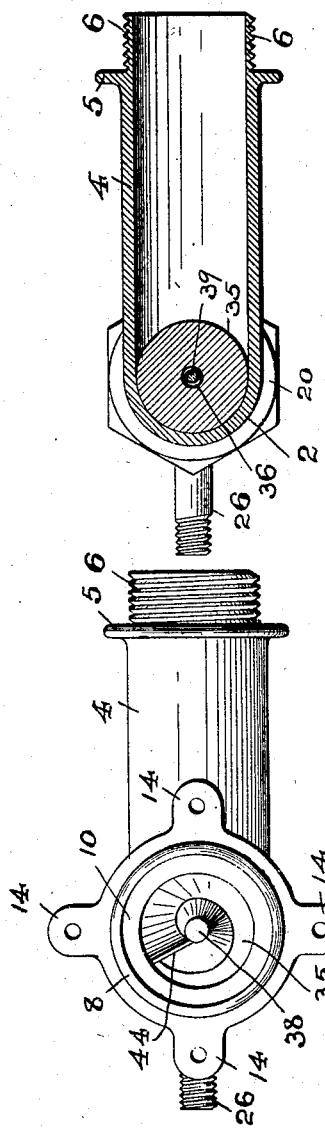
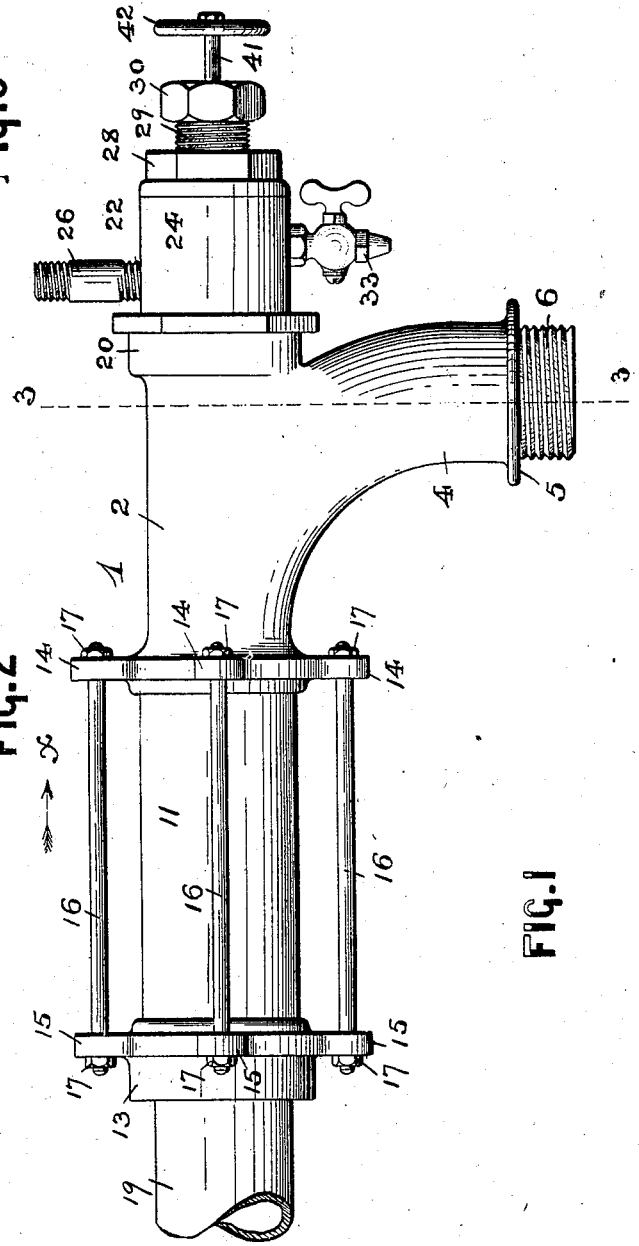
WITNESSES:
Geo. D. Richards
W. B. Fraentzel
INVENTOR:
GEORGE C. WIEDENMAYER,
BY
Fred'k C. Fraentzel,
ATTORNEY No. 718,683. PATENTED JAN. 20, 1903.
G. C. WIEDENMAYER.
CARBONATING DEVICE.
APPLICATION FILED APR. 7, 1902.
NO MODEL. 2 SHEETS—SHEET 2.
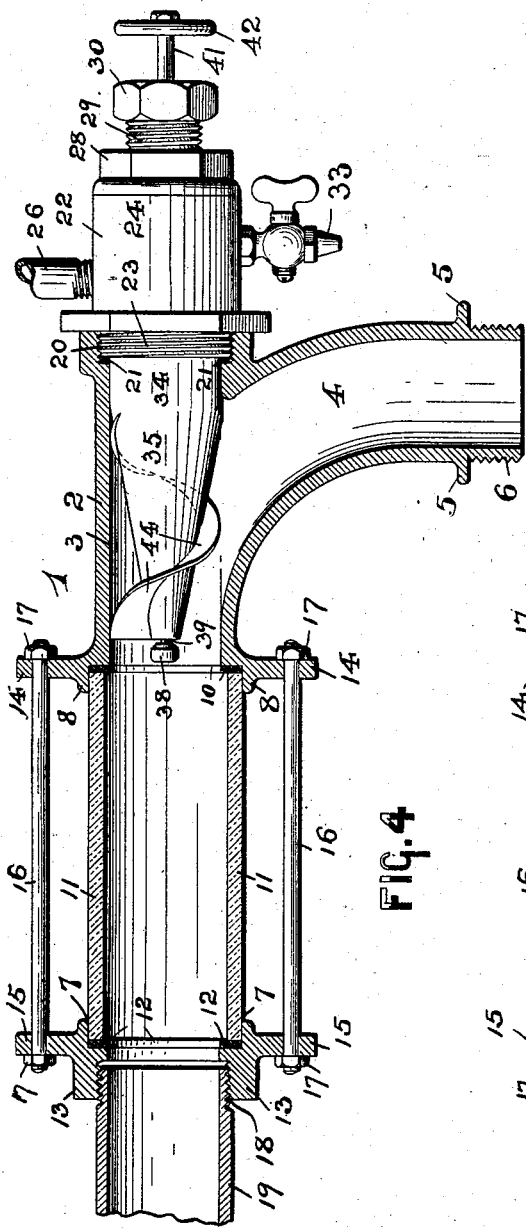
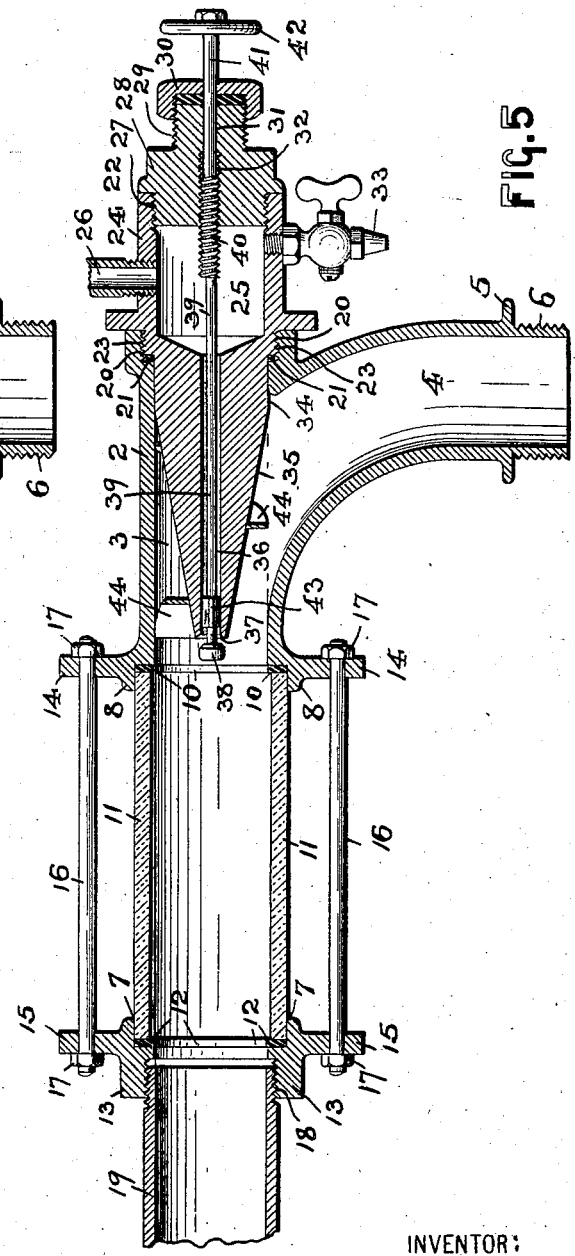
WITNESSES:
Geo. A. Richards
R. B. Fraentzel
INVENTOR:
GEORGE C. WIEDENMAYER,
BY
Fred'k C. Fraentzel,
ATTORNEY.

UNITED STATES PATENT OFFICE.

GEORGE C. WIEDENMAYER, OF NEWARK, NEW JERSEY.

CARBONATING DEVICE.

SPECIFICATION forming part of Letters Patent No. 718,683, dated January 20, 1903.

Application filed April 7, 1902. Serial No. 101,662. (No model.)

*To all whom it may concern:*

Be it known that I, GEORGE C. WIEDENMAYER, a citizen of the United States, residing at Newark, in the county of Essex and State of New Jersey, have invented certain new and useful Improvements in Carbonating Devices; and I do hereby declare the following to be a full, clear, and exact description of the invention, such as will enable others skilled in the art to which it appertains to make and use the same, reference being had to the accompanying drawings, and to numerals of reference marked thereon, which form a part of this specification.

The present invention has reference generally to a novel means or device adapted to be placed in a conveying pipe or duct for conducting liquors which are to be carbonized from the "ruh-tank" or storage-vat to a cooler, filter, or a filling-tank, such as are used in breweries, the said means or device being of such novel construction that at the point of admission of the carbonic-acid gas into the liquid to be carbonated the gas enters under high pressure and is expanded in a fine vapor at this point directly in the liquid flowing through the said conveying pipe or duct, by which liquid the gas is taken up at the pressure of said liquid, and all the gas is thus absorbed without any waste energy.

The primary object of this invention, therefore, is to provide a simply-constructed and efficient means or device for the purposes hereinabove stated, and, furthermore, to provide in connection with the said device a transparent tube or duct member through which the liquid which is to be carbonized flows and through which the gas-delivery valve is exposed to view to readily enable the brewer to judge whether the required volume of gas is being admitted into the liquid, and if not to adjust the position of the admission-valve nearer to or farther away from its valve-seat by a regulating means connected with the valve-stem.

Other objects of this invention not at this time more especially enumerated will be clearly evident from the following detailed description of my invention.

This invention therefore consists in the novel construction of carbonating device hereinafter set forth; and, furthermore, the invention consists in the several novel arrangements and combinations of the various parts, all of which will be fully described in the accompanying specification and then finally embodied in the clauses of the claim.

The invention is clearly illustrated in the accompanying drawings, in which—

Figure 1 is a side elevation of a carbonating device embodying the principles of this invention. Fig. 2 is an end view of the same looking in the direction of the arrow $x$ in said Fig. 1 of the drawings, the transparent tube or member in this view having been omitted; and Fig. 3 is a vertical cross-section taken on line 3 3 in said Fig. 1. Figs. 4 and 5 are longitudinal vertical sections of the carbonating device, in Fig. 4, however, the member through which the carbonic-acid gas is admitted and the various parts connected therewith being represented in side elevation.

Similar characters of reference are employed in all of the said above-described views to indicate corresponding parts.

In the said drawings the reference character 1 indicates the complete carbonating device, and the same consists, essentially, of a main body or casing 2, provided with an inner tubular chamber 3 and an inlet-duct 4. The said inlet-duct 4 is provided, usually, with a flange 5 and a screw-threaded end portion 6 for attachment thereto of a conveying pipe or duct (not shown in the present case) leading from the ruh-tank or storing-vat and for the purpose of conducting the liquid which is to be carbonated into the said chamber 3. The said main body or casing 2 is made at its one end with an annular shoulder 8, which is formed with a recess for the reception of a rubber gasket or other suitable packing-ring 10 and the one end of a glass or other transparent conveying-tube 11. The opposite end of the said tube 11 is arranged against a rubber gasket or other packing-ring 12, placed directly within an annular recess 7, formed in a union or connecting-ring 13. The main body or casing 2 is also made with a suitable number of perforated ears or lugs 14, and the said union or ring 13 is likewise provided with correspondingly-arranged perforated ears or lugs 15, the said parts being securely tied together to prevent leakage by means of tie-bolts 16, which are arranged in the perforations of the oppositely-placed ears or lugs 14 and 15 and are held against displacement in their fixed positions by means of nuts 17 or any other suitable fastening means. The said union or ring 13 is also made with a screw-threaded receiving portion or socket 18, into which is screwed the end of a delivery pipe or duct 19 for conveying the carbonated liquid to a cooler, filter, or a filling-tank, as may be desired.

Referring to Figs. 1, 4, and 5, it will be seen that the end of the said main body or casing 2 back of the inlet-duct 4 is also made with a screw-threaded receiving portion or socket 20, into which is screwed against a rubber gasket or other suitable packing-ring 21 the screw portion 23 of a combined gas-receiving and valve-stem-retaining member 22. This member, as will be seen more especially from an inspection of Fig. 5 of the drawings, consists, essentially, of a body portion 24, which is formed with a receiving-chamber 25, into which the carbonic-acid gas is admitted through an inlet or duct 26. The forward end portion of this chamber 25 is made with an internal screw-thread 27 for the reception of a suitably-constructed screw-plug 28, the same being provided upon its outer end with a screw-threaded part 29, upon which is arranged a stuffing-box 30 of any suitable construction. The said plug 28 is made with a tubular duct 31, which is formed with a screw-threaded portion 32, substantially as illustrated. If desired, the said chambered body portion 24 may be provided with a blow-off or a suitable petcock 33 for drawing off from the said chamber 25 any overcharge of the carbonic-acid gas whenever necessary. Directly in front of the screw portion 23 the member 22 is made with a reduced cylindrical part 34, which fits the internal bore of the main body or casing 2 at the point near the receiving-socket 20, as shown, and then tapers to form a cone-shaped member or body portion 35. The said parts or members 34 and 35 are made with a centrally-arranged gas passage or duct 36, which terminates at the apex of the said cone-shaped portion in a valve-seat 37. This valve-seat is preferably made of a conical cross-section for the reception of a conical valve-disk or valve-plug 38. The said valve-seat and valve disk or plug, as will be seen from an inspection of Figs. 4 and 5 of the drawings, are at a point near the end of the transparent tube 11, so that the valve can be readily inspected and the action of the gas upon the liquid while being carbonated can be seen. Connected with the said valve disk or plug 38 is a valve-stem 39, which extends into and entirely through the said gas passage or duct 36 and through the chamber 25, the said valve-stem being made with a screw portion 40, which is screwed into the screw-threaded portion 32 of the tubular duct 31. The forward end portion 41 of said valve-stem extends through the said duct 31 and through the previously-mentioned stuffing-box, and it is provided at its free end with a hand-wheel 42 or other suitable means for turning the said valve-stem 39 to adjust the position of the valve disk or plug 38 from the valve-seat, and thereby regulate the admission of the supply of gas from the chamber 25 and through the duct 36 into the tubular portion of the main body or casing 2 and the said transparent tube 11, wherein the expanded gas is immediately absorbed by the liquid flowing into the parts from the inlet-duct 4.

The arrangement of the valve disk or plug 38 is such that the gas which is emitted at this point under its high pressure in a fine vapor is immediately expanded in the said liquid, which is to be carbonated to the pressure of the said liquid and by which it is entirely absorbed without any waste energy. In order that the valve-stem 39 will not interfere with the flow of the gas through the said gas passage or duct 36, the said stem is of a smaller diameter than the internal diameter of the said passage or duct 36, thereby leaving an unobstructed and clear passage for the gas around the said stem 39; but that the said stem may be kept central within said duct 36 and to retain the valve disk or plug 38 in proper alinement with its valve-seat 37 the said stem is preferably made with a set of radially or other suitably arranged guiding-wings 43, having open spaces between the said wings, so as not to cause any obstruction to the forward flow of the gas.

I prefer to provide the outer surface of the said cone-shaped member or body portion 35 with a helically-arranged conveyer rib or worm 44, as illustrated in Fig. 4, against which the flowing liquid from the inlet-duct 4 is forced, and thereby caused to receive a whirling or spirally-agitated motion, whereby the absorption of the gas by the liquid is more readily and properly accomplished.

From the above description of my invention it will be clearly evident that I have devised a simply-constructed and efficient carbonating means which can be readily arranged in any line of piping, such as is used in a brewery between the rub-tank or storing-vat and another receiving-tank, &c., and the mixture of the gas and liquid can be readily seen during the process of absorption, whereby the workman can at all times admit a proper volume of carbonic-acid gas for its complete absorption by the liquid without any waste energy by simply bringing the spraying means closer to or farther away from the point of admission of the gas into the liquid.

I am aware that changes may be made in the various arrangements and combinations of the parts without departing from the scope of my present invention. Hence I do not limit my invention to the exact arrangements and combinations of the parts as described in the accompanying specification and as illustrated in the drawings thereof, nor do I confine myself to the exact details of the construction of the said parts.

Having thus described my invention, what I claim is—

1. In a carbonating device, the combination, with a tubular main body, adapted to be arranged in a line of pipe through which the liquid to be carbonated flows, a means of admission for the liquid to be carbonated into the said main body, means connected with said body for admitting a carbonating-gas into said main body, means for regulating the volume of the carbonating-gas which is admitted, and a spreading device within said main body for spraying the gas in a fine vapor at its point of emission and thereby expand the gas to the pressure of the liquid to be wholly absorbed by said liquid, and means within said tubular main body for producing a spirally-agitated motion of the admitted liquid, substantially as and for the purposes set forth.

2. In a carbonating device, the combination, with a tubular main body, adapted to be arranged in a line of piping through which the liquid to be carbonated flows, a means of admission for the liquid to be carbonated into the said main body, means connected with said body for admitting a carbonating-gas into said main body, means for regulating the volume of the carbonating-gas which is admitted, a spreading device within said main body for spraying the gas in a fine vapor at its point of emission and thereby expand the gas to the pressure of the liquid to be wholly absorbed by said liquid, and a transparent duct connected with the said main body at a point where the action of the said gas with the liquid takes place and is exposed to view, and means within said tubular main body for producing a spirally-agitated motion of the admitted liquid, substantially as and for the purposes set forth.

3. The herein-described carbonating device, consisting, essentially, of a main body, a liquid-conducting inlet connected with said body, a member in said main body, provided with a gas-receiving chamber, a valve-seat at one end of said member, said member having a tubular duct, a valve-disk adapted to be arranged against the said valve-seat, a valve-stem on said valve-disk, said stem extending through the said duct, means connected with the free end of said valve-stem for removing the said valve-disk from said valve-seat, the said member within the said main body having a cone-shaped surface, and a helical rib surrounding the said cone-shaped surface, substantially as and for the purposes set forth.

4. The herein-described carbonating device, consisting, essentially, of a main body provided with a receiving-socket, and a liquid-conducting inlet connected with said body, a gas-conveying member having a portion secured in said receiving-socket, and a cone-shaped body portion extending into said main body, the said gas-conveying member being also provided with a gas-receiving chamber, a gas-duct extending from said chamber through the said cone-shaped body portion and terminating at the apex thereof, and an adjustably-arranged gas-expanding means located at the said apex, substantially as and for the purposes set forth.

5. The herein-described carbonating device, consisting, essentially, of a main body provided with a receiving-socket, and a liquid-conducting inlet connected with said body, a gas-conveying member having a portion secured in said receiving-socket, and a cone-shaped body portion extending into said main body, the said gas-conveying member being also provided with a gas-receiving chamber, a gas-duct extending from said chamber through the said cone-shaped body portion and terminating at the apex thereof, an adjustably-arranged gas-expanding means located at the said apex, and a helical rib surrounding the said cone-surface, substantially as and for the purposes set forth.

6. The herein-described carbonating device, consisting, essentially, of a main body provided with a receiving-socket, and a liquid-conducting inlet connected with said body, a gas-conveying member having a portion secured in said receiving-socket, and a cone-shaped body portion extending into said main body, the said gas-conveying member being also provided with a gas-receiving chamber, a gas-duct extending from said chamber through the said cone-shaped body portion and terminating at the apex thereof, a valve-seat at the said apex, a valve-disk adapted to be arranged against the said valve-seat, a valve-stem on said valve-disk, said stem extending through the said gas-duct, and means connected with the free end of said valve-stem for removing the said valve-disk from said valve-seat, substantially as and for the purposes set forth.

7. The herein-described carbonating device, consisting, essentially, of a main body provided with a receiving-socket, and a liquid-conducting inlet connected with said main body, a gas-conveying member having a portion secured in said receiving-socket, and a cone-shaped body portion extending into said main body, the said gas-conveying member being also provided with a gas-receiving chamber, a gas-duct extending from said chamber through the said cone-shaped body portion and terminating at the apex thereof, a valve-seat at the said apex, a valve-disk on said valve-seat, a valve-stem on said valve-disk, said stem extending through the said gas-duct, means connected with the free end of said valve-stem for removing the said valve-disk from said valve-seat, and a helical rib surrounding the said cone-surface, substantially as and for the purposes set forth.

8. The herein-described carbonating device, consisting, essentially, of a main body provided with a receiving-socket, and a liquid-conducting inlet connected with said body, a gas-conveying member having a portion secured in said receiving-socket, and a cone-shaped body portion extending into said main body, the said gas-conveying member being also provided with a gas-receiving chamber, a stuffing-box connected with said chamber, a gas-duct extending from said chamber through the said cone-shaped body portion and terminating at the apex thereof, a valve-seat at said apex, a valve-disk adapted to be arranged against the said valve-seat, a valve-stem on said valve-disk, said valve-stem extending through the said gas-duct, said gas-chamber and said stuffing-box, and means connected with the free end of said valve-stem for removing the valve-disk from said valve-seat, substantially as and for the purposes set forth.

9. The herein-described carbonating device, consisting, essentially, of a main body provided with a receiving-socket, and a liquid-conducting inlet connected with said body, a gas-conveying member having a portion secured in said receiving-socket, and a cone-shaped body portion extending into said main body, the said gas-conveying member being also provided with a gas-receiving chamber, a stuffing-box connected with said chamber, a gas-duct extending from said chamber through the said cone-shaped body portion and terminating at the apex thereof, a valve-seat at said apex, a valve-disk adapted to be arranged against the said valve-seat, a valve-stem on said valve-disk, said valve-stem extending through the said gas-duct, said gas-chamber and said stuffing-box, means connected with the free end of said valve-stem for removing the valve-disk from said valve-seat, and a helical rib surrounding the said cone-shaped surface, substantially as and for the purposes set forth.

10. The herein-described carbonating device, consisting, essentially, of a main body provided with a receiving-socket, and a liquid-conducting inlet connected with said main body, a gas-conveying member having a portion secured in said receiving-socket, and a cone-shaped body portion extending into the said main body, the said gas-conveying member being also provided with a gas-receiving chamber, a gas-duct extending from the said chamber through the said cone-shaped body portion and terminating at the apex thereof, an adjustably-arranged gas-expanding means located at the said apex, and an outlet-valve connected with the said gas-receiving chamber for drawing off any excess of carbonic-acid gas, substantially as and for the purposes set forth.

In testimony that I claim the invention set forth above I have hereunto set my hand this 4th day of April, 1902.

GEORGE C. WIEDENMAYER.

Witnesses:
FREDK. C. FRAENTZEL,
GEO. D. RICHARDS.